United States Patent
Drumheller et al.

(10) Patent No.: US 12,272,018 B2
(45) Date of Patent: Apr. 8, 2025

(54) MODELING SYSTEM FOR 3D VIRTUAL MODEL

(71) Applicant: The Boeing Company, Chicago, IL (US)

(72) Inventors: Michael Drumheller, Seattle, WA (US); Paul Zack Thunemann, Seattle, WA (US); Craig S. Bosma, Madison, AL (US); Jeffrey David Poskin, Black Diamond, WA (US); Troy Winfree, Seattle, WA (US)

(73) Assignee: The Boeing Company, Arlington, VA (US)

( * ) Notice: Subject to any disclaimer, the term of this patent is extended or adjusted under 35 U.S.C. 154(b) by 63 days.

(21) Appl. No.: 17/812,996

(22) Filed: Jul. 15, 2022

(65) Prior Publication Data
US 2024/0020935 A1    Jan. 18, 2024

(51) Int. Cl.
*G06T 19/20*  (2011.01)
*G06T 7/64*   (2017.01)
*G06T 17/30*  (2006.01)

(52) U.S. Cl.
CPC .......... *G06T 19/20* (2013.01); *G06T 7/64* (2017.01); *G06T 17/30* (2013.01); *G06T 2219/2021* (2013.01)

(58) Field of Classification Search
CPC .......... G06T 19/20; G06T 7/64; G06T 17/30; G06T 2219/2021; G06T 2219/021;
(Continued)

(56) References Cited

U.S. PATENT DOCUMENTS

| | | | | |
|---|---|---|---|---|
| 4,858,150 A | * | 8/1989 | Aizawa | G06T 19/20 345/420 |
| 4,999,789 A | * | 3/1991 | Fiasconaro | G06T 17/20 345/620 |

(Continued)

OTHER PUBLICATIONS

C. Miao and S. Qi, "Research on hull configuration method of curve and surface based on NURBS," 2014 IEEE International Conference on Mechatronics and Automation, Tianjin, China, 2014, pp. 862-867, doi: 10.1109/ICMA.2014.6885810. (Year: 2014).*

(Continued)

*Primary Examiner* — Charles L Beard
(74) *Attorney, Agent, or Firm* — Alleman Hall & Tuttle LLP

(57) ABSTRACT

A modeling system is provided which is configured to retrieve from the non-volatile memory the 3D virtual model of an object; define a domain of a parametric surface; project feature curves in the 3D virtual model into the domain of the parametric surface to generate a mapping based on the 3D virtual model and including a plurality of parametric curves; divide the plurality of parametric curves into horizontal and vertical feature curves; extend each of the horizontal feature and vertical feature curves; construct a horizontal interpolant connecting the extended horizontal feature curves; construct a vertical interpolant connecting the extended vertical feature curves; fit the horizontal and vertical interpolants as coordinates of a map to a new parametric domain; and compose the inverse of the map to the new parametric domain with the parametric surface to create a new parametric surface containing the feature curves as isoparametric curves.

20 Claims, 9 Drawing Sheets

(58) Field of Classification Search
CPC . G06T 2207/20068; G06T 2207/20104; G06T 2207/20108; G06T 2207/20112; G06T 17/05; G06T 17/10; G06T 17/20; G06T 11/001; G06T 17/00; G06T 19/006
See application file for complete search history.

(56) References Cited

U.S. PATENT DOCUMENTS

| | | | | |
|---|---|---|---|---|
| 5,107,444 A * | 4/1992 | Wu | G06T 17/20 | 345/419 |
| 5,163,015 A * | 11/1992 | Yokota | G06F 30/23 | 703/7 |
| 5,243,694 A * | 9/1993 | Fiasconaro | G09G 1/06 | 345/441 |
| 5,255,352 A * | 10/1993 | Falk | G06T 15/04 | 345/582 |
| 5,467,409 A * | 11/1995 | Yamamoto | G06T 15/405 | 382/285 |
| 5,550,960 A * | 8/1996 | Shirman | G06T 15/04 | 345/582 |
| 5,559,334 A * | 9/1996 | Gupta | G01C 11/02 | 250/358.1 |
| 5,577,176 A * | 11/1996 | Friedman | G06F 3/04812 | 345/678 |
| 5,581,672 A * | 12/1996 | Letcher, Jr. | G06T 17/00 | 703/2 |
| 5,592,599 A * | 1/1997 | Lindholm | G06T 15/10 | 348/E5.051 |
| 5,615,319 A * | 3/1997 | Metzger | G06T 11/203 | 345/427 |
| 5,617,491 A * | 4/1997 | Roth | G06T 17/30 | 345/441 |
| 5,619,625 A * | 4/1997 | Konno | G06T 17/30 | 345/441 |
| 5,649,081 A * | 7/1997 | Nakajima | G06T 19/20 | 345/419 |
| 5,673,377 A * | 9/1997 | Berkaloff | G06T 15/04 | 345/585 |
| 5,701,404 A * | 12/1997 | Stevens | G06T 17/30 | 345/442 |
| 5,706,418 A * | 1/1998 | Uchiyama | G06T 15/04 | 345/582 |
| 5,831,619 A * | 11/1998 | Nakagawa | G06T 1/60 | 345/419 |
| 5,880,736 A * | 3/1999 | Peercy | G06T 15/60 | 345/426 |
| 5,886,703 A * | 3/1999 | Mauldin | G06T 15/04 | 345/423 |
| 5,903,458 A * | 5/1999 | Stewart | G06T 17/30 | 700/118 |
| 5,949,424 A * | 9/1999 | Cabral | G06T 15/60 | 345/426 |
| 5,995,109 A * | 11/1999 | Goel | G06T 15/04 | 345/441 |
| 6,052,157 A * | 4/2000 | Weihs | H04N 9/78 | 348/638 |
| 6,084,586 A * | 7/2000 | Ooka | G06T 17/30 | 345/419 |
| 6,249,289 B1 * | 6/2001 | Arnaud | G06T 15/005 | 345/582 |
| 6,271,856 B1 * | 8/2001 | Krishnamurthy | G06T 11/40 | 345/581 |
| 6,300,958 B1 * | 10/2001 | Mallet | G06T 15/04 | 345/442 |
| 6,369,815 B1 * | 4/2002 | Celniker | G06T 17/00 | 345/420 |
| 6,392,645 B1 * | 5/2002 | Han | G06T 17/10 | 345/619 |
| 6,462,740 B1 * | 10/2002 | Immel | G06T 13/20 | 345/473 |
| 6,552,725 B1 * | 4/2003 | Houtman | G06T 17/20 | 345/423 |
| 6,600,485 B1 * | 7/2003 | Yoshida | G06T 17/30 | 345/419 |
| 6,639,592 B1 * | 10/2003 | Dayanand | G06T 17/30 | 345/419 |
| 6,683,620 B1 * | 1/2004 | Burke | G06T 17/30 | 345/623 |
| 6,856,312 B1 * | 2/2005 | Imai | G06T 17/30 | 345/419 |
| 6,862,023 B1 * | 3/2005 | Shaikh | G06T 17/10 | 345/472 |
| 6,867,769 B1 * | 3/2005 | Toriya | G06T 17/20 | 345/420 |
| 6,903,742 B1 * | 6/2005 | Fushiki | G06T 11/203 | 345/443 |
| 6,941,251 B1 * | 9/2005 | Stallings | G06T 19/20 | 703/2 |
| 7,180,523 B1 * | 2/2007 | Macri | G06T 15/04 | 345/582 |
| 7,200,532 B1 * | 4/2007 | Cheng | G06T 17/20 | 703/2 |
| 7,467,074 B2 * | 12/2008 | Faruque | G06T 17/20 | 703/7 |
| 7,747,055 B1 * | 6/2010 | Vining | A61B 8/483 | 382/130 |
| 7,944,443 B1 * | 5/2011 | Milliron | G06T 15/00 | 345/473 |
| 7,969,435 B1 * | 6/2011 | DeSimone | G06T 17/00 | 703/2 |
| RE42,534 E * | 7/2011 | Sfarti | G06T 17/20 | 345/423 |
| 8,031,957 B1 * | 10/2011 | Vinchon | G06T 9/001 | 382/241 |
| 8,269,770 B1 * | 9/2012 | Carr | G06T 17/20 | 345/581 |
| 8,332,189 B2 * | 12/2012 | Rameau | G06F 30/00 | 703/2 |
| 8,417,485 B2 * | 4/2013 | Grandine | G06T 11/203 | 700/98 |
| 8,654,121 B1 * | 2/2014 | Yu | G06T 17/205 | 345/428 |
| 8,665,261 B1 * | 3/2014 | Baraff | G06T 7/344 | 345/428 |
| 8,681,147 B1 * | 3/2014 | Baraff | G06T 15/04 | 345/582 |
| 8,704,823 B1 * | 4/2014 | Waggoner | G06T 19/20 | 345/428 |
| 8,743,115 B1 * | 6/2014 | Mallet | G01V 20/00 | 345/419 |
| 8,786,611 B1 * | 7/2014 | Comet | G06T 19/20 | 345/473 |
| 8,836,701 B1 * | 9/2014 | Rockwood | G06F 30/10 | 345/441 |
| 8,970,628 B1 * | 3/2015 | Jensen | G06T 19/20 | 345/647 |
| 9,639,981 B1 * | 5/2017 | Holliday | G06T 17/10 | |
| 9,734,616 B1 * | 8/2017 | Comet | G06T 19/20 | |
| 9,841,271 B2 * | 12/2017 | Nakazato | G06T 7/75 | |
| 10,210,631 B1 * | 2/2019 | Cinnamon | G06T 15/503 | |
| 10,242,484 B1 * | 3/2019 | Cernigliaro | G06T 9/008 | |
| 10,456,225 B2 * | 10/2019 | Jesenko | A61C 13/0004 | |
| 10,909,746 B1 * | 2/2021 | Kantar | G06V 20/647 | |
| 11,127,225 B1 * | 9/2021 | Kowalski | G06T 19/006 | |
| 11,566,888 B1 * | 1/2023 | Rollinson | B25J 18/00 | |
| 11,640,485 B1 * | 5/2023 | Seibold | G06T 17/20 | 703/1 |
| 2001/0033281 A1 * | 10/2001 | Yoshida | G06T 17/30 | 345/420 |
| 2002/0033821 A1 * | 3/2002 | Sfarti | G06T 17/30 | 345/582 |
| 2002/0191863 A1 * | 12/2002 | Biermann | G06T 17/20 | 382/285 |
| 2003/0103063 A1 * | 6/2003 | Mojaver | H04N 23/58 | 345/647 |
| 2004/0085311 A1 * | 5/2004 | Lee | G06T 17/30 | 345/419 |

(56) References Cited

U.S. PATENT DOCUMENTS

| | | | | |
|---|---|---|---|---|
| 2004/0090437 A1* | 5/2004 | Uesaki | G06T 17/30 | 345/420 |
| 2004/0113910 A1* | 6/2004 | Tsai | G06T 17/20 | 345/420 |
| 2004/0215431 A1* | 10/2004 | Xu | D04B 37/00 | 703/6 |
| 2004/0227755 A1* | 11/2004 | Sfarti | G06T 17/20 | 345/423 |
| 2005/0057568 A1* | 3/2005 | Sfarti | G06T 17/30 | 345/442 |
| 2005/0084140 A1* | 4/2005 | Kakadiaris | G06V 40/172 | 382/118 |
| 2005/0114099 A1* | 5/2005 | Boier-Martin | G06T 17/205 | 703/2 |
| 2005/0128211 A1* | 6/2005 | Berger | G06T 15/04 | 345/582 |
| 2005/0249400 A1* | 11/2005 | Fukumoto | G01B 11/2518 | 382/154 |
| 2006/0050074 A1* | 3/2006 | Bassi | G06T 3/02 | 345/427 |
| 2006/0170676 A1* | 8/2006 | Ugail | G06T 17/10 | 345/421 |
| 2006/0173659 A1* | 8/2006 | Ugail | G06T 17/10 | 703/2 |
| 2006/0244745 A1* | 11/2006 | Majer | G06F 3/04815 | 345/419 |
| 2007/0031028 A1* | 2/2007 | Vetter | G06V 40/169 | 382/154 |
| 2007/0176923 A1* | 8/2007 | Lee | B66D 3/006 | 345/420 |
| 2008/0259077 A1* | 10/2008 | Liepa | G06F 30/00 | 345/423 |
| 2009/0073162 A1* | 3/2009 | Waatti | B33Y 50/00 | 345/581 |
| 2009/0074238 A1* | 3/2009 | Pfister | G06T 7/77 | 382/100 |
| 2009/0079737 A1* | 3/2009 | Inoue | G06T 17/30 | 345/424 |
| 2010/0053325 A1* | 3/2010 | Inagaki | G06T 3/18 | 382/282 |
| 2010/0156935 A1* | 6/2010 | Lim | G06T 19/20 | 345/647 |
| 2011/0010140 A1* | 1/2011 | Hoitsma | G06F 17/18 | 703/2 |
| 2011/0074766 A1* | 3/2011 | Page | G06T 19/00 | 715/848 |
| 2011/0078223 A1* | 3/2011 | Maekawa | G06T 17/20 | 708/270 |
| 2011/0123096 A1* | 5/2011 | Tsai | G06T 7/13 | 382/154 |
| 2012/0046782 A1* | 2/2012 | Schulze | G05B 19/4093 | 700/187 |
| 2012/0093365 A1* | 4/2012 | Aragane | G06T 5/80 | 348/E7.078 |
| 2013/0107003 A1* | 5/2013 | Lim | G06T 13/40 | 348/46 |
| 2013/0162633 A1* | 6/2013 | Berger | G09G 5/00 | 345/582 |
| 2013/0177258 A1* | 7/2013 | Inagaki | G06T 3/18 | 382/293 |
| 2013/0187913 A1* | 7/2013 | McDaniel | G06T 17/30 | 345/420 |
| 2014/0184599 A1* | 7/2014 | Quilot | G06T 17/10 | 345/423 |
| 2014/0267268 A1* | 9/2014 | Tipton | G06T 19/20 | 345/424 |
| 2014/0354639 A1* | 12/2014 | Rockwood | G06F 30/00 | 345/420 |
| 2015/0071488 A1* | 3/2015 | Wei | G06T 7/536 | 382/103 |
| 2015/0321427 A1* | 11/2015 | Gunnarsson | G05B 19/4099 | 700/98 |
| 2015/0325044 A1* | 11/2015 | Lebovitz | G06T 15/04 | 345/420 |
| 2016/0093104 A1* | 3/2016 | Bowen | G06T 19/20 | 345/589 |
| 2016/0162608 A1* | 6/2016 | Rockwood | G06T 17/10 | 703/1 |
| 2016/0179987 A1* | 6/2016 | Walle | G06F 17/10 | 703/1 |
| 2017/0008106 A1* | 1/2017 | Wuerfel | G05B 19/29 | |
| 2017/0008107 A1* | 1/2017 | Wuerfel | B23F 19/002 | |
| 2017/0032563 A1* | 2/2017 | Distler | G06T 15/04 | |
| 2017/0148207 A1* | 5/2017 | Sheng | G06T 17/10 | |
| 2017/0177980 A1* | 6/2017 | Alibay | G06V 10/40 | |
| 2017/0180644 A1* | 6/2017 | Alibay | H04N 23/683 | |
| 2017/0308631 A1* | 10/2017 | Hishida | G06N 5/04 | |
| 2018/0218535 A1* | 8/2018 | Ceylan | G06T 7/90 | |
| 2018/0240272 A1* | 8/2018 | Doolittle | G06T 17/20 | |
| 2018/0330480 A1* | 11/2018 | Liu | G06T 15/04 | |
| 2018/0350132 A1* | 12/2018 | Paulson | G06T 17/10 | |
| 2018/0365371 A1* | 12/2018 | Urick | G06F 30/15 | |
| 2019/0035150 A1* | 1/2019 | Owechko | G06T 17/20 | |
| 2019/0084224 A1* | 3/2019 | Guimbretiere | G06T 17/20 | |
| 2019/0088014 A1* | 3/2019 | Richards | G06T 19/00 | |
| 2019/0206109 A1* | 7/2019 | Chu | G06T 13/40 | |
| 2019/0215532 A1* | 7/2019 | He | H04N 13/383 | |
| 2019/0362029 A1* | 11/2019 | Huang | G06T 17/30 | |
| 2020/0019651 A1* | 1/2020 | Rockwood | G06T 17/10 | |
| 2020/0150624 A1* | 5/2020 | Marinov | G06T 17/20 | |
| 2020/0250889 A1* | 8/2020 | Li | G06T 7/73 | |
| 2020/0257833 A1* | 8/2020 | Marini | G06F 30/15 | |
| 2021/0059519 A1* | 3/2021 | Hara | A61B 3/0041 | |
| 2021/0110611 A1* | 4/2021 | Forutanpour | G06T 15/00 | |
| 2021/0141869 A1* | 5/2021 | Bächer | G06F 30/20 | |
| 2021/0142561 A1* | 5/2021 | Aigerman | G06T 15/04 | |
| 2021/0165923 A1* | 6/2021 | Johnston | G06F 1/163 | |
| 2021/0279957 A1* | 9/2021 | Eder | H04N 23/90 | |
| 2021/0407174 A1* | 12/2021 | Walker | G06T 15/06 | |
| 2022/0020214 A1* | 1/2022 | Joris | G06T 17/20 | |
| 2022/0100929 A1* | 3/2022 | Samsonowicz | G06F 30/10 | |
| 2022/0108422 A1* | 4/2022 | Choi | G06T 17/20 | |
| 2022/0130098 A1* | 4/2022 | Hunter | G06T 13/40 | |
| 2022/0198091 A1* | 6/2022 | Erdim | G01N 29/4472 | |
| 2022/0207828 A1* | 6/2022 | Pinskiy | G06T 17/20 | |
| 2022/0261512 A1* | 8/2022 | Mehr | G06T 7/162 | |
| 2022/0277514 A1* | 9/2022 | Yin | G06T 7/529 | |
| 2022/0289403 A1* | 9/2022 | Afrasiabi | G06V 20/64 | |
| 2022/0318466 A1* | 10/2022 | Jayaraman | G06F 30/10 | |
| 2022/0335170 A1* | 10/2022 | Okada | G06T 17/30 | |
| 2022/0414284 A1* | 12/2022 | Poskin | G06F 30/20 | |
| 2023/0039397 A1* | 2/2023 | Lu | G06F 30/12 | |
| 2023/0051312 A1* | 2/2023 | Catana Salazar | B33Y 50/00 | |
| 2023/0063575 A1* | 3/2023 | Huang | G06T 9/20 | |
| 2023/0131481 A1* | 4/2023 | Rockwood | G06F 17/10 | 703/1 |
| 2023/0177229 A1* | 6/2023 | Marini | G06F 30/10 | 703/7 |
| 2023/0276887 A1* | 9/2023 | Quek | G06T 17/205 | 703/6 |
| 2023/0296918 A1* | 9/2023 | Muschielok | G02C 7/028 | 351/159.74 |
| 2023/0298216 A1* | 9/2023 | Zhang | G06V 20/20 | |
| 2023/0306701 A1* | 9/2023 | Huang | G06T 9/001 | |
| 2024/0051242 A1* | 2/2024 | Harik | G06F 30/20 | |
| 2024/0078752 A1* | 3/2024 | Erdim | G06T 17/10 | |
| 2024/0134344 A1* | 4/2024 | Zheng | B29C 64/386 | |
| 2024/0161430 A1* | 5/2024 | Dhingra | G06T 7/13 | |
| 2024/0249475 A1* | 7/2024 | Jindal | G06T 7/80 | |

OTHER PUBLICATIONS

Pengfei Yi, Xiaopeng Wei and Tingting Zhao, "GA-based creative shape design method integrating surface fitting and generating," 2008 7th World Congress on Intelligent Control and Automation, Chongqing, 2008, pp. 7898-7901, doi: 10.1109/WCICA.2008. 4594162. (Year: 2008).*

M. Siddiqui and S. Sclaroff, "Surface reconstruction from multiple views using rational B-splines and knot insertion," Proceedings.

(56) References Cited

OTHER PUBLICATIONS

First International Symposium on 3D Data Processing Visualization and Transmission, Padua, Italy, 2002, pp. 372-378, doi: 10.1109/TDPVT.2002.1024086. (Year: 2002).*

European Patent Office, Extended European Search Report Issued in Application No. 23163447.8, Dec. 15, 2023, Germany, 11 pages.

Liu, L. et al., "Weighted T-splines with application in reparameterizing trimmed NURBS surfaces," Computer Methods in Applied Mechanics and Engineering, vol. 295, Jul. 9, 2015, 19 pages.

* cited by examiner

MODELING SYSTEM FOR 3D VIRTUAL MODEL

FIELD

The field of the present disclosure relates generally to modeling systems and, more specifically, to systems and methods of adaptively fitting a three-dimensional (3D) model.

BACKGROUND

Modern manufacturing applies 3D modeling in a wide variety of applications to accurately model manufacturing objects of various sizes and shapes. One widely used technique of 3D virtual modeling is spline modeling, which uses polynomial functions over a parameter domain to represent an object. Although spline modeling is often used for objects with curved surfaces, modeling objects with relatively sharp edges using spline modeling may lead to a model with an excessive number of control points that do not accurately track the curved features of the object, resulting in bumps or sagging along curvatures or creases in the model.

SUMMARY

In view of the above, a modeling system is provided, including at least one processor, communicatively coupled to non-volatile memory storing a 3D virtual model and instructions. When the processor executes the instructions, they cause the processor to retrieve from the non-volatile memory the 3D virtual model of an object; define a first parameter domain; parameterize the 3D virtual model over the first parameter domain to thereby generate a parameterized surface representing the 3D virtual model; identify one or more feature curves in the 3D virtual model; project the one or more feature curves in the 3D virtual model into the first parameter domain of the parameterized surface to generate a plurality of two-dimensional curves in the first parameter domain of the parameterized surface; define a second parameter domain; construct a map between the first parameter domain and the second parameter domain; compose an inverse of the map with the parameterized surface to obtain a reparameterized surface; and output the reparameterized surface. According to the map, an image of each projected feature curve is contained in a fixed value of a parameter domain variable of the second parameter domain; and the map is invertible, and maps a boundary of the first parameter domain to a boundary of the second parameter domain.

The features, functions, and advantages that have been discussed can be achieved independently in various embodiments or can be combined in yet other embodiments further details of which can be seen with reference to the following description and drawings.

DETAILED DESCRIPTION

Figure 1:
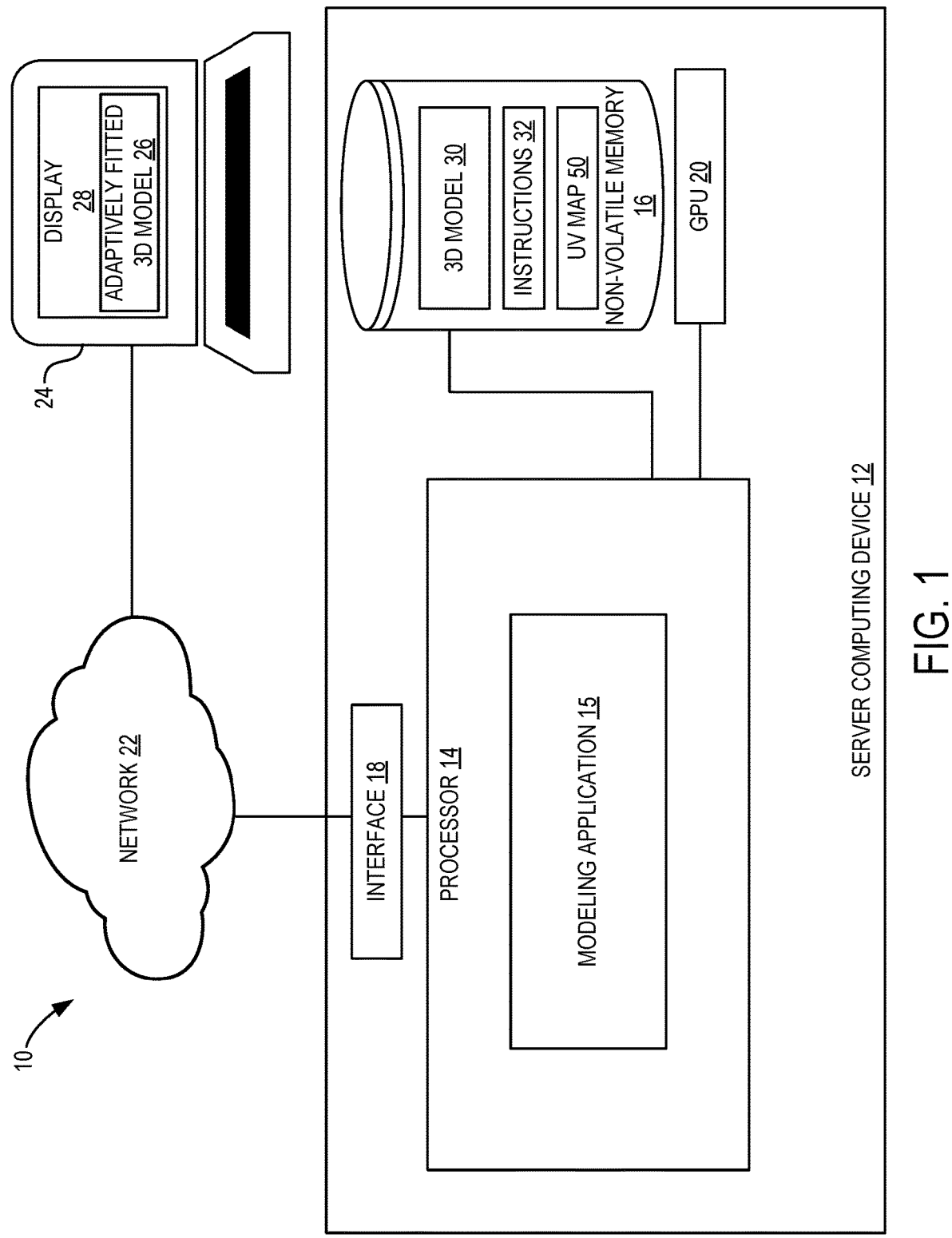
FIG. 1 is a general schematic diagram illustrating an overview of a modeling system according to an example of the subject disclosure.
Figure 8:
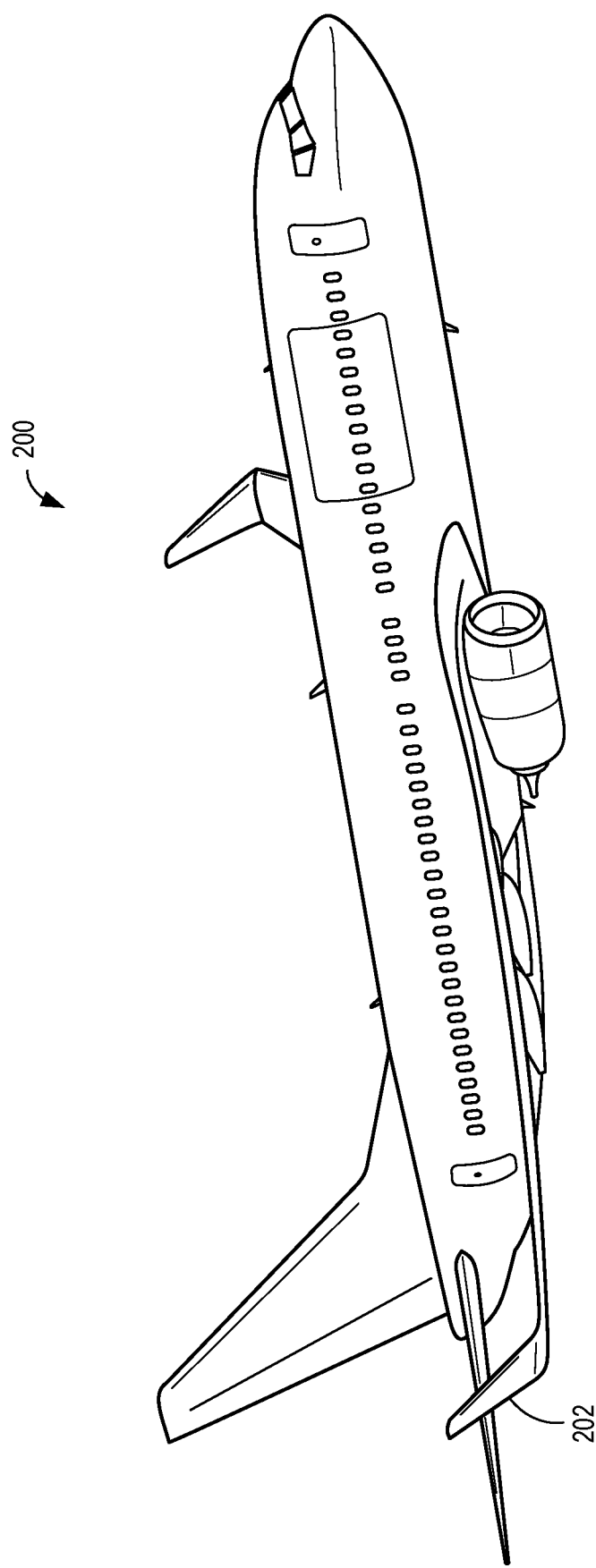
FIG. 8 is an illustration of an aircraft that can be modeled by a modeling system according to an example of the subject disclosure.

In view of the above issues, as shown in FIG. 1, a schematic diagram of a modeling system 10 is depicted comprising a server computing device 12 which includes one or more processors 14, which can be communicatively coupled to a network 22. The server computing device 12 further comprises non-volatile memory 16 storing a three-dimensional (3D) virtual model 30 and instructions 32 that, when executed by the processor 14, cause the processor 14 to retrieve the 3D virtual model 30 from the non-volatile memory 16. The 3D virtual model 30 can be of an aircraft or an aircraft component, or other manufactured parts or components, for example, as illustrated in FIG. 8. The sizes of the 3D virtual model 30 are not particularly limited—the 3D virtual model 30 can be of micron-scale objects in such applications as printed circuit boards or medical devices, or of over-sized objects.

The 3D virtual model 30 is the mathematical representation of the surface geometry of an object, so that computer-rendered images of the object can be created from any angle. The 3D virtual model 30 can be a tensor-product spline surface model comprising polynomial splines and their tensor products.

The non-volatile memory 16 can further store a U-V mapping 50, onto which one or more feature curves of the 3D virtual model 30 can be projected to produce a plurality of two dimensional curves (U-V curves). The U-V mapping is a parameterized surface and can be a piecewise polynomial mapping between a two-dimensional rectangular parameter domain and three-dimensional space.

The server computing device 12 includes a network interface 18 to affect the communicative coupling to the network 22 and, through the network 22, a client computing device 24. The client computing device 24 comprises a display 28 which is configured to display an adaptively fitted 3D virtual model 26 which is outputted by the server computing device 12. Network interface 18 can include a physical network interface, such as a network adapter.

The server computing device 12 can be a special-purpose computer, adapted for reliability and high-bandwidth communications. Thus, the system 10 can be embodied in a cluster of individual hardware server computers, for example. The processor 14 can be multi-core processors suitable for handling large amounts of information. The processor 14 is communicatively coupled to non-volatile memory 16 storing a 3D virtual model 30, U-V mapping 50, and instructions 32 which can be executed by the processor 14 to effectuate the techniques disclosed herein on concert with the client computing device 24 as shown and described below. The non-volatile memory 16 can be in a Redundant Array of Inexpensive Disk drives (RAID) configuration for added reliability. The processor 14 can also be communicatively coupled to graphical co-processors (GPU) 20. Graphical co-processors 20 can expedite the technique disclosed herein by performing operations in parallel.

The processor 14 is configured to execute a modeling application 15. The modeling application 15 is configured to retrieve a 3D virtual model 30 from the non-volatile memory 16, define a first parameter domain, parameterize the 3D virtual model 30 over the first parameter domain to thereby generate a U-V mapping 50, which is a parameterized surface representing the 3D virtual model 30, identify one or more feature curves in the 3D virtual model 30, and project the one or more feature curves in the 3D virtual model 30 into the first parameter domain of the parameterized surface 50 to generate a plurality of two-dimensional curves in the first parameter domain of the parameterized surface. When generating the plurality of two-dimensional curves, the modeling application 15 can be configured to divide the plurality of two-dimensional U-V curves into horizontal feature curves and vertical feature curves. In some examples, the modeling application 15 can be configured to extend each of the horizontal feature curves and the vertical feature curves.

The modeling application 15 is further configured to define a second parameter domain, and construct a map between the first parameter domain and the second parameter domain, according to which an image of each projected feature curve is contained in a fixed value of a parameter domain variable of the second parameter domain. The map is invertible, and maps a boundary of the first parameter domain to a boundary of the second parameter domain. In constructing the map between the first parameter domain and the second parameter domain, the modeling application 15 can define horizontal interpolants connecting the horizontal feature curves, and define vertical interpolants connecting the vertical feature curves.

The modeling application 15 is further configured to compose an inverse of the map with the parameterized surface to obtain a reparameterized surface, so as to adaptively fit the horizontal interpolants and the vertical interpolants on the U-V mapping 50 of the 3D virtual model 30, so that the feature curves are isoparametric curves of the reparameterized surface within a predetermined tolerance. The adaptively fitted 3D virtual model 26 with the reparameterized surface is then outputted on the display 28. Although adaptive fitting is given in this example, it will be appreciated that alternative fitting schemes can also be applied to fit the interpolants to lie on the reparameterized surface within the predetermined tolerance.

Figure 2:
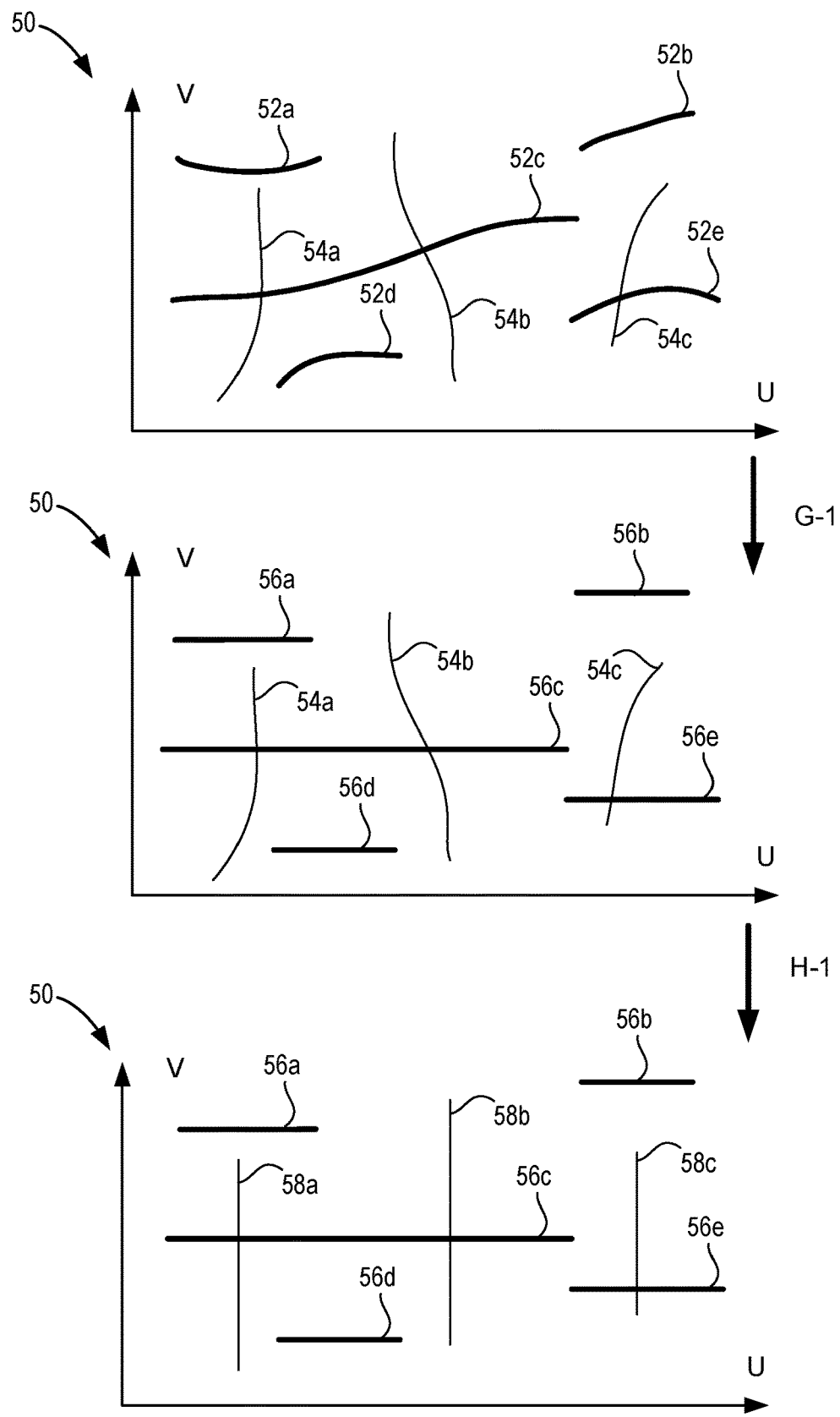
FIG. 2 is an illustration of the construction of a map for obtaining a reparameterized surface, according to an example of the subject disclosure.

FIG. 2 shows an illustration of the construction of a map for obtaining a reparameterized surface according to an example of the present disclosure. In this illustration, the U-V mapping 50 has a plurality of two-dimensional U-V curves 52a-e, 54a-c which are divided into horizontal feature curves 52a-e (indicated as the bold lines) and vertical feature curves 54a-c. In one example, an angle of a line connecting the start point and the end point of a curve is calculated as an arctangent value. If this arctangent value is less than 45 degrees, the curve is categorized as a horizontal feature curve. Otherwise, if the arctangent value is 45 degrees or greater, the curve is categorized as a vertical feature curve.

As shown in FIG. 2, a horizontal map function G-1 subsequently straightens all the horizontal feature curves 52a-e into straight horizontal lines 56a-e, and a vertical map function H-1 straightens all the vertical feature curves 54a-c into straight vertical lines 58a-c. Horizontal map function G-1 and vertical map function H-1 are combined as the coordinates of a function F-1 that maps to the second parameter domain. The inverse of function F-1 maps horizontal lines in the second parameter domain to horizontal feature curves in the first parameter domain, and vertical lines in the second parameter domain to vertical feature curves in the first parameter domain.

Figure 3:
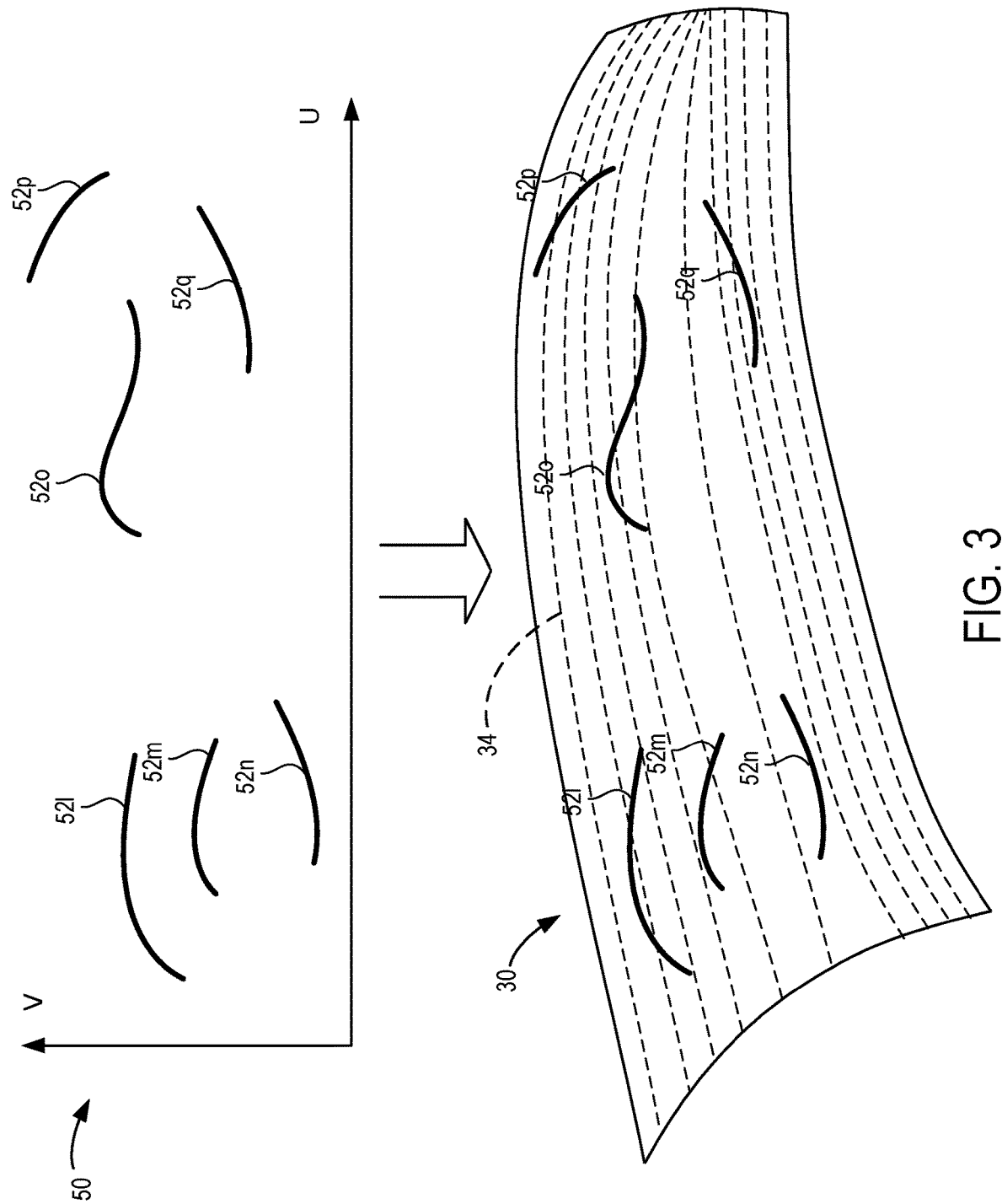
FIGS. 3 and 4 is an illustration of the adaptive fitting of interpolants onto a 3D virtual model, according to an example of the subject disclosure.

Referring to FIG. 3, the projection of one or more feature curves of the 3D virtual model 30 onto a U-V mapping 50, which is a parameterized surface, is depicted. A U-V coordinate is determined and stored for each vertex in a mesh of the 3D image, so that the contours, vertices, faces, and edges of the 3D image in the 3D space correspond to those in the U-V mapping 50. Accordingly, the processor 14 defines a first parameter domain (U-V space), parameterizes the 3D virtual model 30 over the first parameter domain (U-V space) to thereby generate a parameterized surface 50 representing the 3D virtual model 30, and projects the one or more feature curves in the 3D virtual model 30 into the first parameter domain (U-V space) of the parameterized surface 50 to generate a plurality of two-dimensional curves 521-q in the first parameter domain of the parameterized surface 50.

Figure 4:
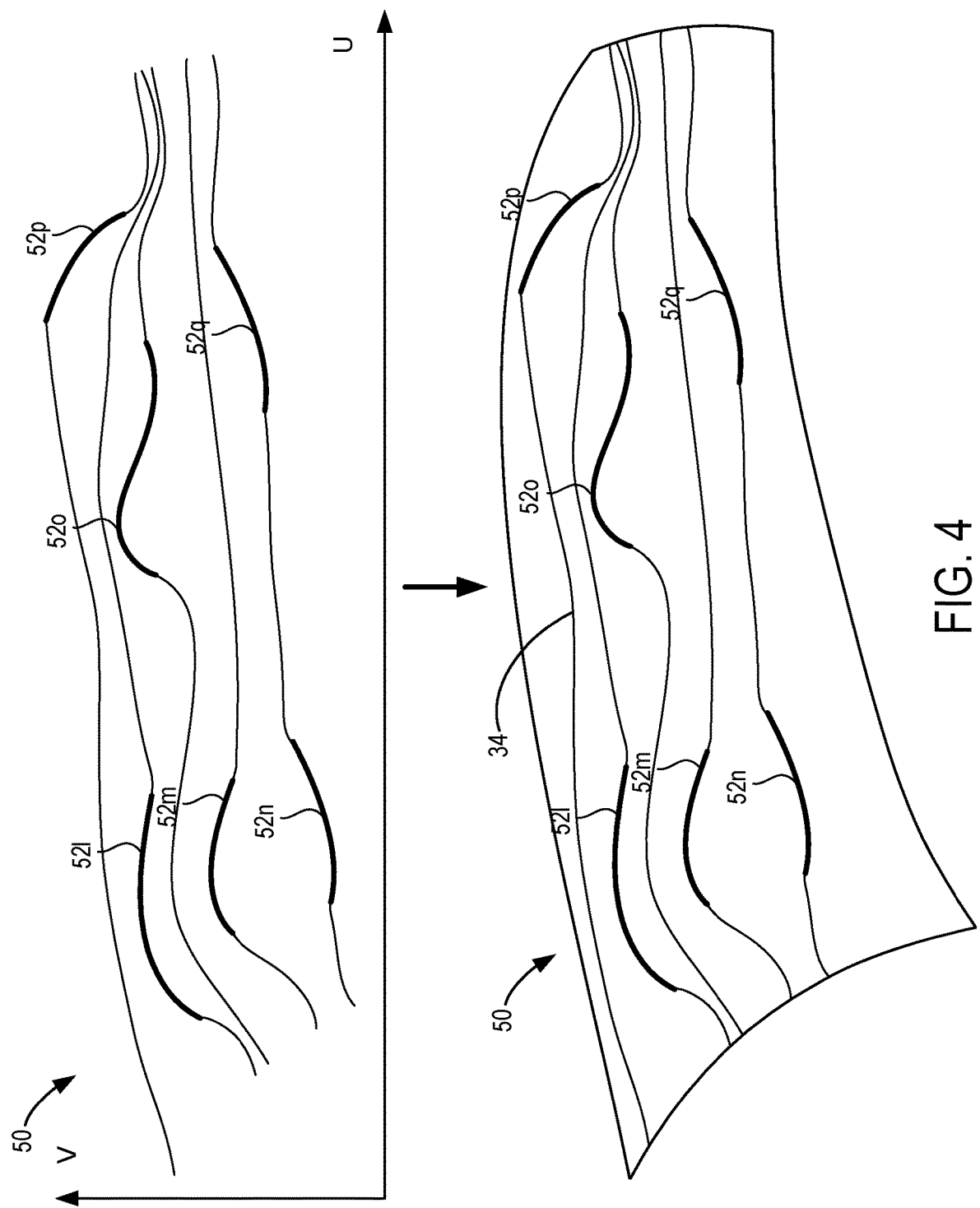

However, in the example of FIG. 3, the feature curves 521-q in the U-V mapping 50 do not yet align with horizontal or vertical lines in parameter space. Therefore, as shown in the example of FIG. 4, each of the feature curves 521-q are extended. Then, adaptive fitting is performed to fit the horizontal function G-1 and the vertical function H-1 which form the coordinates of a function F-1 that maps horizontal feature curves to straight horizontal lines in the second parameter space and vertical feature curves to straight vertical lines in the second parameter space. The composition from the second parameter space through the inverse of the function F-1 and along the U-V surface parameterization map to the 3D surface is adaptively fit to form a second 3D surface parameterization so that the horizontal and vertical feature curves occur as constant isoparametric curves of the second parameterization to within a predetermined tolerance. As shown in FIG. 4, the horizontal feature curves and the vertical feature curves are adaptively fitted through the second parameterization of the virtual model 26 so that the feature curves 521-q occur as U-V curves 34 of the reparameterized surface. Although adaptive fitting is given in this example, it will be appreciated that alternative fitting schemes can also be applied to fit the second reparameterization so that the horizontal and vertical feature curves are isoparametric curves and align with the original feature 3D feature curves to within the predetermined tolerance.

Figure 5:
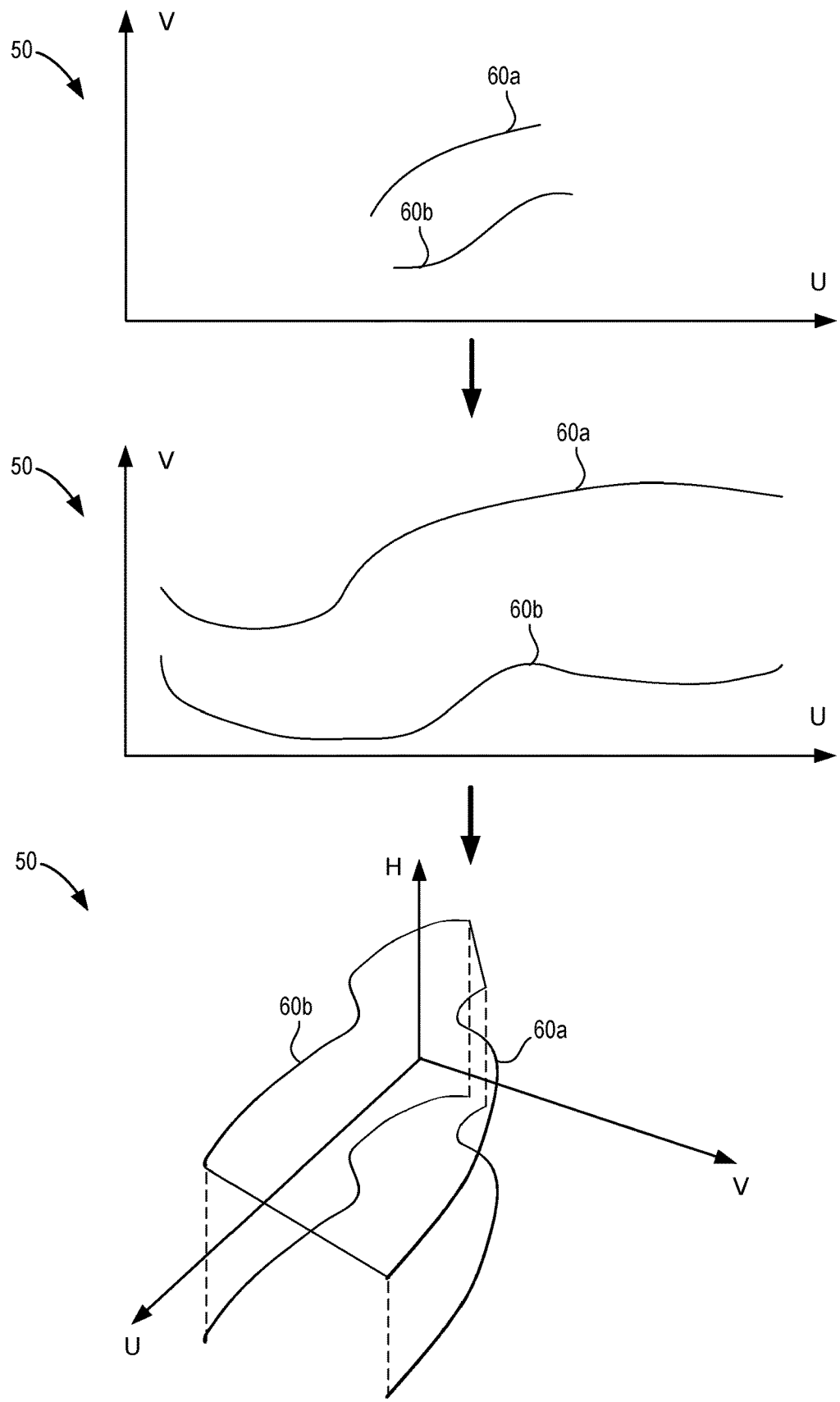
FIGS. 5 and 6 are an illustration of the construction of a map to obtain a reparameterized surface to connect extended features curves, according to an example of the subject disclosure.

FIG. 5 is an example of a process to construct horizontal map functions. In this example, a function above the U-V parameter domain is constructed by placing the extended horizontal feature curves at fixed heights along the H direction and interpolating a monotonically increasing surface between them. The horizontal map H-1 is adaptively fit so that its graph matches the monotonic interpolant to within a predetermined tolerance.

Figure 6:
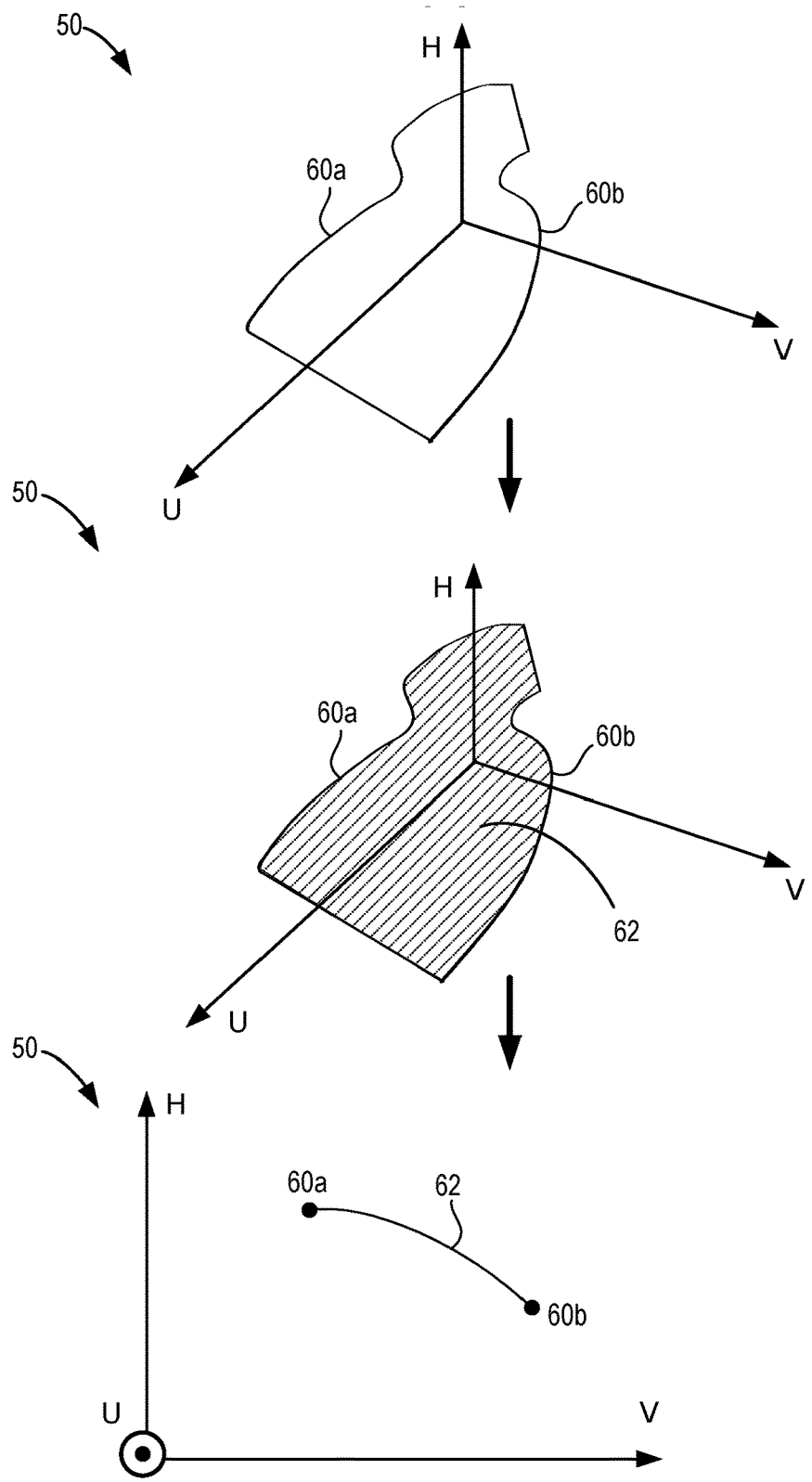

Referring to FIG. 5, the feature curves 60a, 60b are first extended to the right and to the left. Then, the extended feature curves are shifted to a fixed heights in three-dimensions along the H-axis as shown in FIG. 5. Then, as shown in FIG. 6, a graph surface 62 is obtained which connects the feature curves 60a, 60b monotonically along the H-axis, so that the graph surface 62 monotonically increases between the feature curves 60a, 60b. In alternative examples, the graph surface 62 does not connect the feature curves 60a, 60b, but rather slightly overshoots or undershoots points on the feature curves 60a, 60b. The graph surface 62 can also skip certain feature curves by considering two feature curves that are close together as a 'shared' feature curve. For example, when the feature curves 60a, 60b are determined to be close together by determining that a separation distance between the feature curves 60a, 60b is below a predetermined threshold, then feature curves 60a, 60b can be considered to be a 'shared' feature curve, and the graph surface 62 can interpolate feature curve 60a and not feature curve 60b. It will be appreciated that, in 3D modeling applications involving objects with relatively complicated shapes, there can be thousands of these feature curves that are all connected by a graph surface monotonically, so that the graph surface monotonically increases across all of the feature curves.

Figure 7:
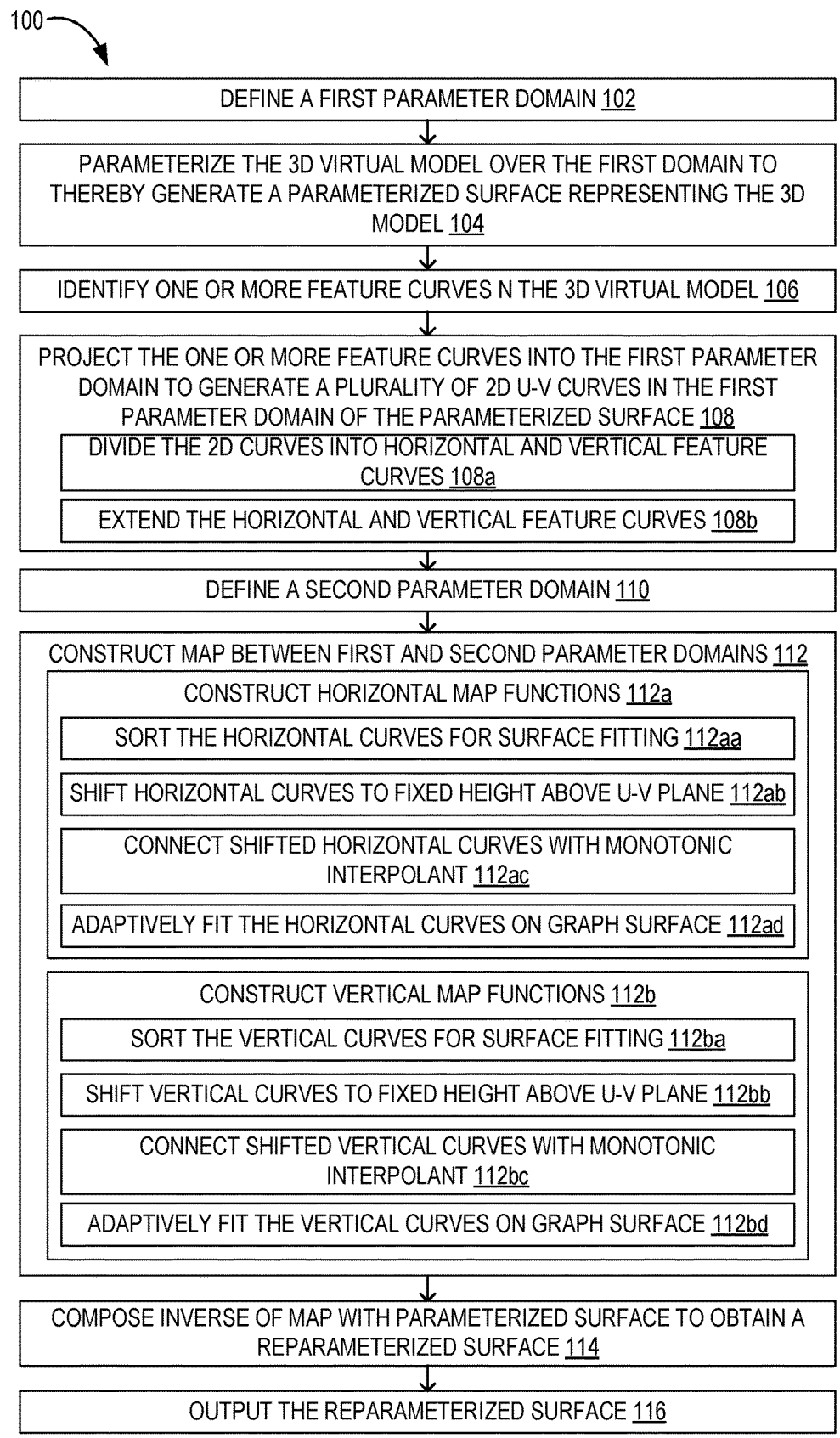
FIG. 7 is a flowchart of a modeling method according to an example of the subject disclosure.

FIG. 7 shows an exemplary method 100 for virtual modeling according to an example of the present disclosure. The following description of method 100 is provided with reference to the software and hardware components described above and shown in FIGS. 1 through 6. It will be appreciated that method 100 also can be performed in other contexts using other suitable hardware and software components.

At step 102, a first parameter domain is defined. At step 104, the 3D virtual model is parameterized over the first domain to thereby generate a parameterized surface representing the 3D virtual model. The parameterized surface can be a spline surface, for example. At step 106, one or more feature curves are identified in the 3D virtual model. At step 108, the one or more feature curves in the 3D virtual model are projected into the first parameter domain of the parameterized surface to generate a plurality of two-dimensional U-V curves in the first parameter domain of the parameterized surface.

Step 108 can further include step 108a. At step 108a, the plurality of two-dimensional U-V curves are divided into horizontal feature curves and vertical feature curves. In this step, an angle of a line connecting the start point and the end point of a curve can be calculated. If this angle is less than 45 degrees, the curve is categorized as a horizontal feature curve. Otherwise the curve is categorized as a vertical feature curve.

Step 108 can further include step 108b. At step 108b, each of the horizontal feature curves and the vertical feature curves are extended through tangent fields in order to reach the parametric boundary of the initially defined first parameter domain. For a given horizontal feature curve, the curve can be extended to the right and to the left by integrating through the tangent field of the curve, assuming that the curve runs horizontally. For a given vertical feature curve, the curve can be extended to the right and to the left by integrating through the tangent field of the curve, assuming that the curve runs vertically. The tangent fields can comprise distance-weighted averages of tangents at each projection of the feature curves. The distance-weighted averages of the tangents can be calculated by calculating a sum of the inverse squares of the distances of the tangents at each projection of the feature curves. Each extended feature curve can be assigned a parameter value based on an integration under the feature curve.

At step 110, a second parameter domain is defined. At step 112, a map is constructed between the first parameter domain and the second parameter domain. According to the map, an image of each projected feature curve is contained in a fixed value of a parameter domain variable of the second parameter domain. The map is invertible, and maps a boundary of the first parameter domain to a boundary of the second parameter domain.

Step 112 for map construction can include step 112a. At step 112a, a horizontal map function is constructed from a graph surface that interpolates the horizontal feature curves shifted to constant heights above the first parameter space. The defined horizontal map function is a component of the map to the second parameter domain that straightens the projected feature curves. In this step, at step 112aa, horizontal feature curves are sorted for surface fitting. The feature curves can be rearranged to be ordered based on ascending assigned parameter values. At step 112ab, horizontal feature curves are shifted to a fixed height above the U-V plane. At step 112ac, the shifted horizontal curves are connected with a graph surface which is a monotonic interpolant. At step 112ad, the horizontal feature curves are adaptively fitted on the graph surface. Other alternative fitting schemes can also be applied to fit the horizontal feature curves on the graph surface within a predetermined tolerance.

Step 112 for map construction can include step 112b. At step 112b, a vertical map function is constructed from a graph surface that interpolates the vertical feature curves shifted to constant heights above the first parameter space. The defined vertical map function is a component of the map to the second parameter domain that straightens the projected feature curves. In this step, at step 112ba, vertical feature curves are sorted for surface fitting. The extended feature curves can be rearranged to be ordered based on ascending assigned parameter values. At step 112bb, vertical feature curves are shifted to a fixed height above the U-V plane. At step 112bc, the shifted vertical feature curves are connected with a graph surface which is a monotonic interpolant. At step 112bd, the vertical feature curves are adaptively fitted on the graph surface. Other alternative fitting schemes can also be applied to fit the vertical feature curves on the graph surface within a predetermined tolerance.

At step 114, an inverse of the map from the first parameter space to the second parameter space is composed with the parameterized surface to obtain a reparameterized surface in which the feature curves are isoparametric curves to within a predetermined tolerance. The composition can be adaptively fit to produce a 3D spline surface. Although adaptive fitting is given in this example, it will be appreciated that alternative fitting schemes can also be applied, so that the feature curves occur as isoparametric curves up to a given tolerance. At step 116, the reparameterized surface is outputted.

FIG. 8 is an image of an aircraft 200 according to some embodiments. It will be appreciated that the aircraft 200 or a component 202 thereof can be the object that is modeled by the 3D virtual model in accordance with the system 10 and method 100 of the subject disclosure.

The systems and processes described herein have the potential benefit of building 3D virtual models with spline surfaces that model complicated shapes accurately and efficiently without using an excessive number of control points, so that the isoparametric curves of the 3D virtual model track the features of the 3D virtual model, including curvatures, folds, and creases without 'bumps' or 'sagging'. Thus, the 3D virtual model of the present disclosure improves accuracy. By reducing the number of control points in the 3D virtual model, the model becomes easier to work with for designers and programmers. Conventionally, designers and programmers would synthesize data represented in multiple separate geometric patches for each feature detected in the model, which was processor and memory intensive, so that the synthesized model could be input into analysis software programs. Producing a synthesized version of the patches is a time-consuming, processor intensive, and memory intensive process. In contrast, the 3D virtual model of the present disclosure can save processor and memory resources by avoiding such laborious synthesis of separate geometries. Further, by fitting the feature curves to isoparametric curves of the 3D virtual model, they can be used as engineering features in computer-aided design (CAD) applications, thereby improving the technical compatibility of the model as compared to prior approaches.

The fitted 3D virtual models outputted by the systems and processes described herein can be used in various applications. For example, the fitted 3D virtual model can be used in additive manufacturing applications, for example, to optimize the weight, cost, and/or function of a 3D manufactured object through 3D model modifications. The fitted 3D virtual model can also be used to detect surface anomalies during inspection of the skin of manufactured or assembled parts of aircraft using three-dimensional modeling, for example.

Figure 9:
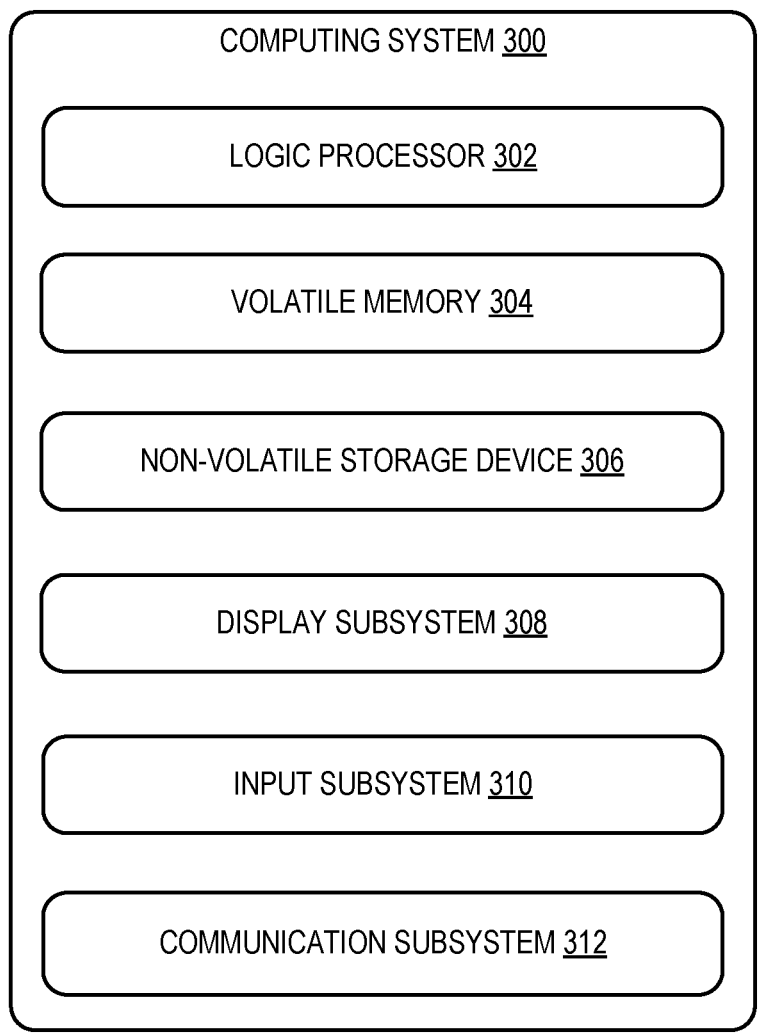
FIG. 9 is a schematic diagram illustrating an exemplary computing system that can be used to implement the modeling system of FIGS. 1-7.

FIG. 9 illustrates an exemplary computing system 300 that can be utilized to implement the system 10 and method 100 described above. Computing system 300 includes a logic processor 302, volatile memory 304, and a non-volatile storage device 306. Computing system 300 can optionally include a display subsystem 308, input subsystem 310, communication subsystem 312 connected to a computer network, and/or other components not shown in FIG. 9. These components are typically connected for data exchange by one or more data buses when integrated into single device, or by a combination of data buses, network data interfaces, and computer networks when integrated into separate devices connected by computer networks.

The non-volatile storage device 306 stores various instructions, also referred to as software, that are executed by the logic processor 302. Logic processor 302 includes one or more physical devices configured to execute the instructions. For example, the logic processor 302 can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 302 can include one or more physical processors (hardware) configured to execute software instructions. Additionally or alternatively, the logic processor 302 can include one or more hardware logic circuits or firmware devices configured to execute hardware-implemented logic or firmware instructions. Processors of the logic processor 302 can be single-core or multi-core, and the instructions executed thereon can be configured for sequential, parallel, and/or distributed processing. Individual components of the logic processor 302 optionally can be distributed among two or more separate devices, which can be remotely located and/or configured for coordinated processing. Aspects of the logic processor 302 can be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 can be transformed—e.g., to hold different data.

Non-volatile storage device 306 can include physical devices that are removable and/or built-in. Non-volatile storage device 306 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 can include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 can include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of the modeling system 10 typically implemented in software by a processor to perform a particular function using portions of volatile memory, which function involves transformative processing that specially configures the processor to perform the function. Thus, a module, program, or engine can be instantiated via logic processor 302 executing instructions held by non-volatile storage device 306, using portions of volatile memory 304. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

Display subsystem 308 typically includes one or more displays, which can be physically integrated with or remote from a device that houses the logic processor 302. Graphical output of the logic processor executing the instructions described above, such as a graphical user interface, is configured to be displayed on display subsystem 308.

Input subsystem 310 typically includes one or more of a keyboard, pointing device (e.g., mouse, trackpad, finger operated pointer), touchscreen, microphone, and camera. Other input devices can also be provided.

Communication subsystem 312 is configured to communicatively couple various computing devices described herein with each other, and with other devices. Communication subsystem 312 can include wired and/or wireless communication devices compatible with one or more different communication protocols. As non-limiting examples, the communication subsystem can be configured for communication via a wireless telephone network, or a wired or wireless local- or wide-area network by devices such as a 3G, 4G, 5G, or 6G radio, WIFI card, ethernet network interface card, BLUETOOTH radio, etc. In some embodiments, the communication subsystem can allow computing system 10 to send and/or receive messages to and/or from other devices via a network such as the Internet. It will be appreciated that one or more of the computer networks via which communication subsystem 312 is configured to communicate can include security measures such as user identification and authentication, access control, malware detection, enforced encryption, content filtering, etc., and can be coupled to a wide area network (WAN) such as the Internet.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein can define patentable subject matter apart from the disclosed examples and can find utility in other implementations not expressly disclosed herein.

To the extent that terms "includes," "including," "has," "contains," and variants thereof are used herein, such terms are intended to be inclusive in a manner similar to the term "comprises" as an open transition word without precluding any additional or other elements.

Further, the disclosure comprises configurations according to the following clauses.

Clause 1. A modeling system comprising: at least one processor, communicatively coupled to non-volatile memory and instructions that, when executed by the processor, cause the processor to: retrieve from the non-volatile memory a 3D virtual model of an object; define a first parameter domain; parameterize the 3D virtual model over the first parameter domain to thereby generate a parameterized surface representing the 3D virtual model; identify one or more feature curves in the 3D virtual model; project the one or more feature curves in the 3D virtual model into the first parameter domain of the parameterized surface to generate a plurality of two-dimensional curves in the first parameter domain of the parameterized surface; define a second parameter domain; construct a map between the first parameter domain and the second parameter domain, according to which an image of each projected feature curve is contained in a fixed value of a parameter domain variable of the second parameter domain; and the map is invertible, and maps a boundary of the first parameter domain to a boundary of the second parameter domain; compose an inverse of the map with the parameterized surface to obtain a reparameterized surface; and output the reparameterized surface.

Clause 2. The modeling system of clause 1, wherein the map comprises a horizontal feature curve interpolant and vertical feature curve interpolant; and the reparameterized surface is obtained by: dividing the plurality of two-dimensional curves into horizontal feature curves and vertical feature curves; constructing a horizontal interpolant connecting the horizontal feature curves; constructing a vertical interpolant connecting the vertical feature curves; and fitting the horizontal interpolant and the vertical interpolant as a function to the second parameter space so that the feature curves occur as horizontal and vertical grid lines in the second parameter space.

Clause 3. The modeling system of clause 1 or 2, wherein each of the horizontal feature curves and the vertical feature curves are extended by integrating through tangent fields of the feature curves.

Clause 4. The modeling system of any of clauses 1 to 3, wherein the tangent fields comprise distance-weighted averages of tangents at each projection of the feature curves.

Clause 5. The modeling system of any of clauses 1 to 4, wherein the feature curves lie on isoparametric lines of the map, within a predetermined tolerance.

Clause 6. The modeling system of any of clauses 1 to 5, wherein adaptive fitting is used to fit the horizontal and vertical interpolants.

Clause 7. The modeling system of any of clauses 1 to 6, wherein during the definition of the interpolant, the feature curves are rearranged to be ordered based on ascending assigned parameter values.

Clause 8. The modeling system of any of clauses 2 to 7, wherein the definition of the interpolant involves constructing the map such that the feature curves occur as constant height intersections with the interpolant, and the interpolant monotonically increases between feature curves.

Clause 9. The modeling system of any of clauses 1 to 8, wherein the reparameterized interpolant is a graph surface which overshoots or undershoots points on the feature curves.

Clause 10. The modeling system of any of clauses 1 to 9, wherein the 3D virtual model is a tensor-product spline surface model.

Clause 11. A modeling method comprising: retrieving a 3D virtual model of an object; defining a first parameter domain; parameterizing the 3D virtual model over the first parameter domain to thereby generate the parameterized surface representing the 3D virtual model; identifying one or more feature curves in the 3D virtual model; projecting the one or more feature curves in the 3D virtual model into the first parameter domain of the parameterized surface to generate a plurality of two-dimensional curves in the first parameter domain of the parameterized surface; defining a second parameter domain; construct a map between the first parameter domain and the second parameter domain, according to which an image of each projected feature curve is contained in a fixed value of a parameter domain variable of the second parameter domain; and the map is invertible, and maps a boundary of the first parameter domain to a boundary of the second parameter domain; composing an inverse of the map with the parameterized surface to obtain a reparameterized surface; and outputting the reparameterized surface.

Clause 12. The method of clause 11, wherein the map comprises horizontal map functions and vertical map functions; the reparameterized surface is obtained by: dividing the plurality of two-dimensional curves into horizontal feature curves and vertical feature curves; constructing the horizontal map functions to define horizontal interpolants connecting the horizontal feature curves; constructing the vertical map functions to define vertical interpolants connecting the vertical feature curves; and fitting the horizontal interpolants and the vertical interpolants so that the feature curves occur as horizontal and vertical grid lines in the second parameter space.

Clause 13. The method of clause 11 or 12, wherein the tangent fields comprises distance-weighted averages of tangents at each projection of the feature curves.

Clause 14. The method of any of clauses 11 to 13, wherein the fitted horizontal feature curves and the fitted vertical feature curves lie on the reparameterized surface along isoparametric lines, within a predetermined tolerance.

Clause 15. The method of any of clauses 11 to 14, wherein adaptive fitting is used to fit the plurality of two-dimensional curves in the parameter domain of the reparameterized surface.

Clause 16. The method of any of clauses 11 to 15, wherein during the construction of the map, the feature curves are rearranged to be ordered based on ascending assigned parameter values.

Clause 17. The method of any of clauses 11 to 16, wherein the plurality of two-dimensional curves are divided into horizontal feature curves and vertical feature curves by categorizing two-dimensional curves with an arctangent value of less than 45 degrees as horizontal feature curves, and categorizing two-dimensional curves with an arctangent value of 45 degrees or greater as vertical feature curves.

Clause 18. The method of any of clauses 11 to 17, wherein the definition of the interpolants involves obtaining the reparameterized surface such that the feature curves occur as constant height intersections with the interpolant, and the reparameterized interpolant monotonically increases between feature curves.

Clause 19. The method of any of clauses 11 to 18, wherein the reparameterized interpolant is a graph surface which overshoots or undershoots points on the feature curves.

Clause 20. A modeling system comprising: at least one processor, communicatively coupled to non-volatile memory storing a tensor-product spline surface model and instructions that, when executed by the processor, cause the processor to: retrieve from the non-volatile memory the tensor-product spline surface model of an object; define a first parameter domain; parameterize the tensor-product spline surface model over the first parameter domain to thereby generate a parameterized surface representing the tensor-product spline surface model; identify one or more feature curves in the tensor-product spline surface model; project the one or more feature curves in the tensor-product spline surface model into the first parameter domain of the parameterized surface to generate a plurality of two-dimensional curves in the first parameter domain of the parameterized surface; define a second parameter domain; construct a map between the first parameter domain and the second parameter domain, according to which an image of each projected feature curve is contained in a fixed value of a parameter domain variable of the second parameter domain; and the map is invertible, and maps a boundary of the first parameter domain to a boundary of the second parameter domain; compose an inverse of the map with the parameterized surface to obtain a reparameterized surface; and output the reparameterized surface, wherein to obtain the reparameterized surface, the instructions, when executed by the processor, cause the processor to: divide the plurality of two-dimensional curves into horizontal feature curves and vertical feature curves; and construct the map such that the feature curves occur as horizontal and vertical grid lines in the second parameter space, and the interpolating surface monotonically increases between feature curves.

The invention claimed is:

1. A modeling system comprising:
at least one processor, communicatively coupled to non-volatile memory and instructions that, when executed by the processor, cause the processor to:
retrieve from the non-volatile memory a 3D virtual model of an object;
define a first parameter domain;
parameterize the 3D virtual model over the first parameter domain to thereby generate a parameterized surface representing the 3D virtual model;
identify one or more feature curves in the 3D virtual model;
project the one or more feature curves in the 3D virtual model into the first parameter domain of the parameterized surface to generate a plurality of two-dimensional curves in the first parameter domain of the parameterized surface;
define a second parameter domain;
construct a map, comprising horizontal map functions and vertical map functions, between the first parameter domain and the second parameter domain, according to which
an image of each projected feature curve is contained in a fixed value of a parameter domain variable of the second parameter domain; and
the map is invertible, and maps a boundary of the first parameter domain to a boundary of the second parameter domain;
compose an inverse of the horizontal map functions and the vertical map functions with the parameterized surface to obtain a reparameterized surface, wherein the inverse maps horizontal lines in the second parameter domain to horizontal feature curves in the first parameter domain and maps vertical lines in the second parameter domain to vertical feature curves in the first parameter domain; and
output the reparameterized surface.

2. The modeling system of claim 1, wherein
the reparameterized surface is obtained by:
dividing the plurality of two-dimensional curves into horizontal feature curves and vertical feature curves;
constructing a horizontal interpolant connecting the horizontal feature curves;
constructing a vertical interpolant connecting the vertical feature curves; and
fitting the horizontal interpolant and the vertical interpolant as a function to the second parameter domain so that the feature curves occur as horizontal and vertical grid lines in the second parameter domain.

3. The modeling system of claim 2, wherein each of the horizontal feature curves and the vertical feature curves are extended by integrating through tangent fields of the feature curves.

4. The modeling system of claim 3, wherein the tangent fields comprise distance-weighted averages of tangents at each projection of the feature curves.

5. The modeling system of claim 1, wherein the feature curves lie on isoparametric lines of the map, within a predetermined tolerance.

6. The modeling system of claim 1, wherein adaptive fitting is used to fit horizontal and vertical interpolants.

7. The modeling system of claim 6, wherein during the definition of the horizontal and vertical interpolants, the feature curves are rearranged to be ordered based on ascending assigned parameter values.

8. The modeling system of claim 2, wherein the definition of the horizontal and vertical interpolants involves constructing the map such that the feature curves occur as constant height intersections with the horizontal and vertical interpolants, and the horizontal and vertical interpolants monotonically increase between feature curves.

9. The modeling system of claim 8, wherein the reparameterized surface is a graph surface which overshoots or undershoots points on the feature curves.

10. The modeling system of claim 1, wherein the 3D virtual model is a tensor-product spline surface model.

11. A modeling method comprising:
retrieving a 3D virtual model of an object;
defining a first parameter domain;
parameterizing the 3D virtual model over the first parameter domain to thereby generate the parameterized surface representing the 3D virtual model;
identifying one or more feature curves in the 3D virtual model;
projecting the one or more feature curves in the 3D virtual model into the first parameter domain of the parameterized surface to generate a plurality of two-dimensional curves in the first parameter domain of the parameterized surface;
defining a second parameter domain;
construct a map, comprising horizontal map functions and vertical map functions, between the first parameter domain and the second parameter domain, according to which
an image of each projected feature curve is contained in a fixed value of a parameter domain variable of the second parameter domain; and
the map is invertible, and maps a boundary of the first parameter domain to a boundary of the second parameter domain;
composing an inverse of the horizontal map functions and the vertical map functions with the parameterized surface to obtain a reparameterized surface, wherein the inverse maps horizontal lines in the second parameter domain to horizontal feature curves in the first parameter domain and maps vertical lines in the second parameter domain to vertical feature curves in the first parameter domain; and
outputting the reparameterized surface.

12. The method of claim 11, wherein
the reparameterized surface is obtained by:
dividing the plurality of two-dimensional curves into horizontal feature curves and vertical feature curves;
constructing the horizontal map functions to define horizontal interpolants connecting the horizontal feature curves;
constructing the vertical map functions to define vertical interpolants connecting the vertical feature curves; and
fitting the horizontal interpolants and the vertical interpolants so that the feature curves occur as horizontal and vertical grid lines in the second parameter domain.

13. The method of claim 12, wherein
each of the horizontal feature curves and the vertical feature curves are extended by integrating through tangent fields of the feature curves; and
the tangent fields comprises distance-weighted averages of tangents at each projection of the feature curves.

14. The method of claim 11, wherein the fitted horizontal feature curves and the fitted vertical feature curves lie on the reparameterized surface along isoparametric lines, within a predetermined tolerance.

15. The method of claim 11, wherein adaptive fitting is used to fit the plurality of two-dimensional curves in the first parameter domain of the reparameterized surface.

16. The method of claim 15, wherein during the construction of the map, the feature curves are rearranged to be ordered based on ascending assigned parameter values.

17. The method of claim 12, wherein the plurality of two-dimensional curves are divided into horizontal feature curves and vertical feature curves by categorizing two-dimensional curves with an arctangent value of less than 45 degrees as horizontal feature curves, and categorizing two-dimensional curves with an arctangent value of 45 degrees or greater as vertical feature curves.

18. The method of claim 12, wherein the definition of the horizontal and vertical interpolants involves obtaining the reparameterized surface such that the feature curves occur as constant height intersections with the horizontal and vertical interpolants, and the horizontal and vertical interpolants monotonically increase between feature curves.

19. The method of claim 18, wherein the reparameterized surface is a graph surface which overshoots or undershoots points on the feature curves.

20. A modeling system comprising:
at least one processor, communicatively coupled to non-volatile memory storing a tensor-product spline surface model and instructions that, when executed by the processor, cause the processor to:
retrieve from the non-volatile memory the tensor-product spline surface model of an object;
define a first parameter domain;
parameterize the tensor-product spline surface model over the first parameter domain to thereby generate a parameterized surface representing the tensor-product spline surface model;
identify one or more feature curves in the tensor-product spline surface model;
project the one or more feature curves in the tensor-product spline surface model into the first parameter domain of the parameterized surface to generate a plurality of two-dimensional curves in the first parameter domain of the parameterized surface;
define a second parameter domain;
construct a map between the first parameter domain and the second parameter domain, according to which
an image of each projected feature curve is contained in a fixed value of a parameter domain variable of the second parameter domain; and
the map is invertible, and maps a boundary of the first parameter domain to a boundary of the second parameter domain;
compose an inverse of the map with the parameterized surface to obtain a reparameterized surface; and
output the reparameterized surface, wherein
to obtain the reparameterized surface, the instructions, when executed by the processor, cause the processor to:
divide the plurality of two-dimensional curves into horizontal feature curves and vertical feature curves; and
construct the map such that the feature curves occur as horizontal and vertical grid lines in the second parameter domain, and the interpolating surface monotonically increases between feature curves.

* * * * *